June 1, 1937.  U. A. KEPPINGER  2,082,699
ARTICLE GRIPPING TOOL
Filed March 12, 1935
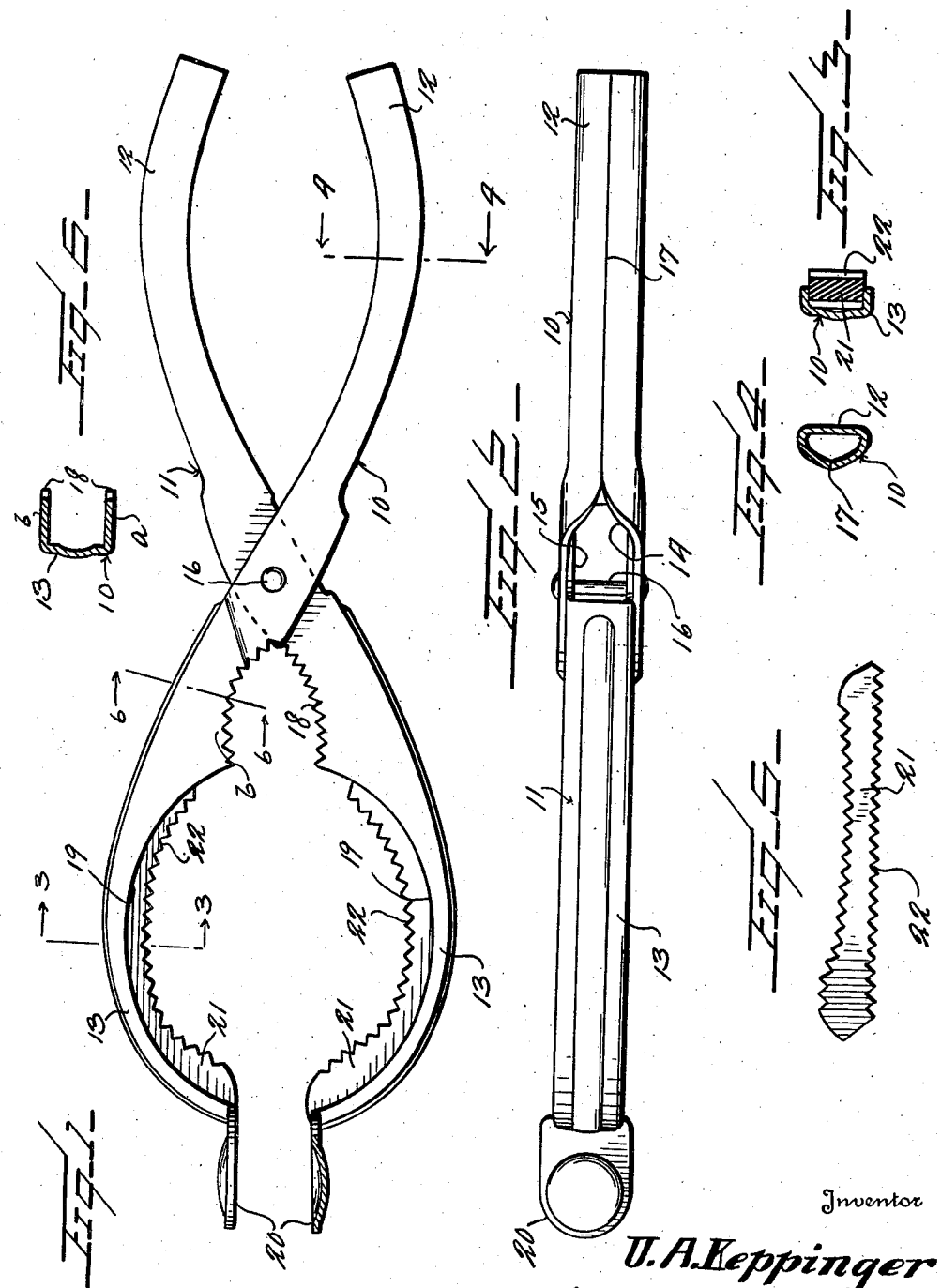
Inventor
U. A. Keppinger
By Watson E. Coleman
Attorney Patented June 1, 1937

2,082,699

UNITED STATES PATENT OFFICE 2,082,699

ARTICLE GRIPPING TOOL

Urban A. Keppinger, Portland, Oreg.

Application March 12, 1935, Serial No. 10,732

1 Claim. (Cl. 81—3.1)

This invention relates to devices of the nature of pincers used for the purpose of removing jar caps and holding articles and particularly to an implement so designed that it may be used for a large number of different purposes in the household.

An object of the invention is to provide a tool or implement of the character stated which is so constructed that it may be used for removing Mason jar caps, removing what are known as "Economy" jar caps, which may be used for removing bottle caps and which also may be used for handling hot clothes and other hot objects, supporting pie plates and like hot articles for insertion or removal into or from an oven, and which is so designed that it may also be used as a nut cracker without the liability of crushing the kernels.

A further object is to provide an implement of this character in which the opposed jaws of the implement are formed with rubber linings or inserts which are toothed so as to secure a good grip upon the article clamped between the jaws and which inserts, being of rubber, will not injure the articles which are being gripped.

A further object is to provide an implement of this character in which the two jars are so designed that they may be each of one piece of material stamped out into the proper shape.

Other objects will appear in the course of the following description.

My invention is illustrated in the accompanying drawing wherein:

Figure 1 is a plan view of my improved implement.

Figure 2 is an edge elevation of the implement shown in Figure 1.

Figure 3 is a section on the line 3—3 of Figure 1.

Figure 4 is a section on the line 4—4 of Figure 1.

Figure 5 is an elevation of one of the rubber inserts.

Figure 6 is a section on the line 6—6 of Figure 1.

Referring to this drawing, it will be seen that the implement is composed of two elements 10 and 11. The element 10 is for a portion of its length U-shaped in cross section, as shown in Figure 3, and is formed to provide a handle section 12 and a jaw portion 13. At the junction of the jaw portion 13 with the handle portion 12, the bottom of the U-shaped element is cut away, as at 14, to permit the section 11 to extend through the section 10. These sections are pivoted to each other by a transverse rivet 16 or equivalent means. The slot 14 is, of course, of sufficient length so as to permit the two sections to be brought into operative relation to each other to clamp an object between them and to permit the jaw ends of the sections to be opened wide.

The two sections 10 and 11 are exactly alike, the section 11 also having a cut-away portion or slot 15 and, therefore, a description of one of the sections will apply to the other. The section 11 has a jaw portion 13 and a handle portion 12. The handle portion 12 of each section is formed by bending the metal of the blank from which the section is made upward and inward, as shown in Figure 4, so as to form a handle transversely flat on its inside face and rounded at its outside face, the joint between these abutting edges being designated 17. Just beyond the pivot each section 10 or 11 has its side walls re-entrantly cut away at 18, the edges of the side walls being serrated to provide a small or minor pair of jaws. When the handles 12 are closed or moved towards each other, the two cut away portions 18 have the form approximately of an oval which is open at one end. Beyond the cut away portions 18 the side walls of each jaw portion 13 are deeply cut away, as at 19 to provide a relatively large or main pair of jaws, and the ends of the main jaws 13 terminate in outwardly extending lugs 20, the inner faces of which are slightly concave. Inserted within the main jaw 13 of each section is a relatively thick strip of rubber 21 having the form shown in Figure 5.

It will be seen that this strip of rubber is thicker at its outer end than at the inner end and that both the inner and outer faces of the rubber are serrated with transversely extending teeth 22. The inserts of rubber 21 are of sufficient width so that they must be jammed and forced into the space between the two side walls of each jaw portion 13 and thus are held tightly in place, but it is an easy matter to remove one of these inserts 21 and then reverse it and replace it within its seat. Thus when one side face of the rubber insert becomes too much worn to properly grip an article, the insert may be removed and reversed and the other toothed face used. This, of course, prolongs the life of the rubber inserts. Furthermore, it may be desirable to form the rubber inserts with teeth on their opposite faces of relatively different form or size; then either face of the rubber insert may be used as circumstances require.

An implement constructed in accordance with my invention is adapted to be used for a large variety of purposes. The relatively large or main jaws formed by the recessed portions 19 are particularly adapted for removing Mason jar caps or like caps and because of the rubber inserts the cap will not be damaged no matter how tightly the cap may be placed upon the jar. Most metal jar openers of this general character injure or mar the Mason jar cap. Furthermore, by reason of the rubber inserts, a tight elastic grip will be had upon the periphery of the jar cap which will prevent the tool from slipping on the jar cap. This tool may also be used for removing and replacing radiator and hub caps and, of course, will do this work without marring or otherwise injuring the hub cap or radiator cap. The tool may also be used for lifting hot clothes from a washing machine to a wringer and for handling hot or wet bottles or cans, thus permitting the tool to be used for handling jars which are being sterilized, or for removing jars from hot water, or sealing these jars or removing cans of soup from hot water.

The relatively small or minor jaws 18 are particularly designed for use in removing beer bottle caps and for cracking nuts. It will be seen that each jaw 18 consists of two parallel serrated walls designated $a$ and $b$ in Figure 6, and that thus the opposed jaws 18 will have four serrated walls so that a nut or like object will be held securely and firmly against these four walls and thus be prevented from turning. As the handles are closed against each other, these opposed jaws will close upon the nut and crack it, but the lugs 20 will prevent the jaws from closing so tightly as to crush the kernel. The lugs 20 may also be used for handling hot pans in removing the pans from an oven and they may be used for gripping a large number of different articles. Because of the concave inside faces of these lugs 20, the lugs may be used for gripping eggs, potatoes, ears of corn, or the like.

In using this device for taking off beer bottle caps, one row of metal teeth 18 is engaged with the top of the cap while the opposite row of lower teeth is placed under the lower edge of the cap. A twist of the wrist will then pry down on the top of the cap and raise up on the bottom thereof and this will remove the cap. "Economy" caps are tripped off in the same manner. Hot lids may be lifted off of hot pots and pans by gripping the same between the lugs 20.

While I have referred to the use of rubber inserts 21, I do not wish to be limited to this, as these inserts might be made of cork or other more or less flexible composition. The device may be obviously used on all the different sizes of screw tops. The device may also be used as a pipe wrench, if necessary, as the tool is strong enough for this purpose.

The jaws 18, because of the four edge-serrated walls, are particularly useful as jaws for removing the caps on catsup bottles and other small screw tops.

It is to be noted particularly that each section of my tool is formed to provide a jaw portion with two parallel walls extending inwardly and that these parallel walls extending inwardly are carried back to a point beyond the intersection of the two sections of the implement and that, because the two sections of the implement are crossed, the two opposed walls may be brought together into edge abutting relation, as shown in Figures 2 and 4, so as to provide handle portions which have smooth exterior faces and which by reason of being in tubular form are rendered particularly strong and rigid. It is likewise pointed out that the jaws which are formed adjacent the pivot 16, as shown in Figure 1, are enabled to grip an article very strongly by reason of the fact that the walls $a$ and $b$ are spaced from each other so as to provide four serrated jaws for the purpose of gripping an article. There is thus provided a four-point bearing against the article which has been found in practice to give an exceedingly good gripping effect and to be particularly good for the purpose of crushing the shells of nuts at a plurality of points instead of merely at one point. It is to be likewise noted that the insert 21 extends beyond both of the walls $a$ and $b$ so that when the implement is disposed around a bottle, for instance, or around any other article, it is the rubber insert alone which grips the article.

The particular design of the rubber inserts is relatively cheap to manufacture, being readily made by forcing the rubber through a "tuber" or rubber expressing machine.

It will be seen that I have provided a single tool which is capable of a large variety of uses, which is cheaply constructed and which, because of its construction, is particularly strong.

What is claimed is:—

A tool of the character described, comprising opposed duplicate sections intersecting each other and disposed in the same plane, each section being formed to provide a handle portion and an outwardly bowed jaw portion, the jaw portions being U-shaped in cross-section to provide a pair of inwardly projecting side walls, and inserts of resiliently yieldable material disposed between the side walls of each of the jaws, the inserts extending inward beyond the edges of both side walls and each insert being thicker at its ends than at its middle.

URBAN A. KEPPINGER.